United States Patent
Lee et al.

(10) Patent No.: US 7,872,710 B2
(45) Date of Patent: Jan. 18, 2011

(54) LIQUID CRYSTAL DISPLAY DEVICE WITH SHIELDING PATTERN

(75) Inventors: Choel Hwan Lee, Kyoungki-do (KR); Suk Choi, Kyoungki-do (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 757 days.

(21) Appl. No.: 11/367,619

(22) Filed: Mar. 3, 2006

(65) Prior Publication Data

US 2007/0081118 A1  Apr. 12, 2007

(30) Foreign Application Priority Data

Oct. 6, 2005 (KR) .................. 10-2005-0093744

(51) Int. Cl.
*G02F 1/1333* (2006.01)
*G02F 1/1339* (2006.01)

(52) U.S. Cl. ........................ 349/110; 349/153

(58) Field of Classification Search .............. 349/153, 349/110
See application file for complete search history.

(56) References Cited

U.S. PATENT DOCUMENTS

2004/0095457 A1 * 5/2004 Pokorny et al. ............ 347/171

2005/0264723 A1 * 12/2005 Lee ............................ 349/110

FOREIGN PATENT DOCUMENTS

| JP | 07-064072 | | 3/1995 |
| JP | 2003-241206 | | 8/2003 |
| JP | 10-2004-0071142 | | 8/2004 |
| KR | 2004-0071142 | * | 8/2004 |
| KR | 10-2005-0050281 A | | 5/2005 |
| KR | 2005-0050281 | * | 5/2005 |
| TW | 200300732 | | 6/2003 |

\* cited by examiner

*Primary Examiner*—David Nelms
*Assistant Examiner*—Lauren Nguyen
(74) *Attorney, Agent, or Firm*—Kelly & Krause, L.P.; Joseph P. Krause

(57) ABSTRACT

Disclosed is an LCD device and a method for fabricating the same, capable of preventing defects derived from a defective UV-curing of a sealant while employing one-drop fill technology. The LCD device includes an array substrate having a metal signal line, a thin film transistor and a pixel electrode, a color filter substrate having a light shielding pattern and a color filter, a sealant interposed between the substrates and cured in order to fixedly combine the array substrate with the color filter substrate, and a liquid crystal layer interposed between the array substrate and the color filter substrate through one-drop fill technology. The shielding pattern is made of resin including a transparent heat-sensitive pigment, in which a color of the heat-sensitive pigment is changed to black through a heat-sensitive reaction and UV light passes through the heat-sensitive pigment.

10 Claims, 2 Drawing Sheets

LIQUID CRYSTAL DISPLAY DEVICE WITH SHIELDING PATTERN

BACKGROUND OF THE INVENTION

1. Field of the Invention

The present invention relates to a liquid crystal display (LCD) device. More particularly, the present invention relates to an LCD device and a method for fabricating the same, capable of preventing defects derived from a defective UV-curing of a sealant while employing one-drop fill technology.

2. Description of the Prior Art

As generally known in the art, a typical twisted nematic (TN) mode LCD device includes an array substrate formed with a metal signal line, a thin film transistor (TFT) and a pixel electrode, a color filter substrate formed with a black matrix, a color filter and a common electrode, and a liquid crystal layer interposed between the array substrate and the color filter substrate.

Herein, the liquid crystal layer is formed through a vacuum injection process employing osmotic pressure. However, as the LCD device has been fabricated in a large size, it becomes difficult to sufficiently inject liquid crystal between substrates through the vacuum injection process. In particular, the vacuum injection process requires a long time to inject liquid crystal between substrates, thereby causing limitations in terms of productivity.

In order to solve the problem of the vacuum injection process, one-drop fill (ODF) technology has been proposed. According to the ODF technology, a predetermined amount of liquid crystal is dropped onto the array substrate, and then the array substrate is combined with the color filter substrate, thereby forming the liquid crystal layer between the array substrate and the color filter substrate.

If the ODF technology is used in the fabrication process for the LCD device, the processes for injecting liquid crystal and assembling substrates are simultaneously performed, so the process time can be significantly reduced as compared with the vacuum injection process.

In order to employ the ODF technology, a UV-curing process for a sealant must be performed during the panel assembling process. However, the sealant coated on the metal signal line (e.g. a gate bus line, a common bus line and a data bus line) of the array substrate and the sealant coated on the black matrix of the color filter substrate may not be sufficiently UV-cured, thereby causing a problem or error when fabricating the panel.

To solve the above problems, conventionally, a slit is formed in the black matrix of the color filter substrate or the metal signal line of the array substrate so as to allow UV light to pass through the slit. In addition, a UV reflecting plate is provided in a UV radiation device so as to allow the UV radiation device to radiate the UV light in various angles.

Nevertheless, the UV light is not sufficiently radiated onto the sealant provided in a specific area, so that the sealant is not cured or incompletely cured, thereby causing the seal leakage and error when assembling the panels. For this reason, reliability and productivity of the panels may be lowered. In addition, the image quality of the LCD device is degraded.

SUMMARY OF THE INVENTION

Accordingly, the present invention has been made to solve the above-mentioned problems occurring in the prior art, and an object of the present invention is to provide an LCD device and a method for fabricating the same, capable of preventing defects derived from a defective UV-curing of a sealant while employing one-drop fill technology.

In order to accomplish the above object, according to one aspect of the present invention, there is provided a liquid crystal display (LCD) device comprising: an array substrate including a first glass substrate formed with a metal signal line, a thin film transistor and a pixel electrode; a color filter substrate aligned in opposition to the array substrate and including a second glass substrate formed with a light shielding pattern and a color filter; a sealant interposed between the array substrate and the color filter substrate and cured as UV light is radiated thereto in order to fixedly combine the array substrate with the color filter substrate; and a liquid crystal layer aligned at an inner portion of the sealant and interposed between the array substrate and the color filter substrate through one-drop fill (ODF) technology, wherein the shielding pattern is made of resin including a transparent heat-sensitive pigment, in which a color of the heat-sensitive pigment is changed to black when the heat-sensitive pigment is subject to a heat-sensitive reaction and UV light passes through the heat-sensitive pigment so that the entire sealant is stably cured, and the light shielding pattern shields light introduced thereto from the array substrate if the color of the heat-sensitive pigment is changed to the black through the heat-sensitive reaction caused by a thermal process.

According to the preferred embodiment of the present invention, the UV-curing process for the sealant is performed at a temperature below a reaction temperature of the heat-sensitive pigment in order to prevent the heat-sensitive reaction of the heat-sensitive pigment.

The color of the heat-sensitive pigment is changed to the black through the heat-sensitive reaction when the thermal process is performed at a temperature of 150 to 250° C.

The color filter substrate further includes an over-coating layer formed on an entire surface of the second glass substrate formed with the light shielding pattern and the color filter in order to planarize the surface of the second glass substrate and an electrode formed on the over-coating layer.

According to another aspect of the present invention, there is provided a method of fabricating a liquid crystal display (LCD) device, the method comprising the steps of: forming a transparent light shielding pattern on a glass substrate such that a pixel area is defined on the glass substrate by the transparent light shielding pattern, the transparent light shielding pattern being made of resin including a heat-sensitive pigment, in which a color of the heat-sensitive pigment is changed to black when the heat-sensitive pigment is subject to a heat-sensitive reaction; fabricating a color filter substrate by forming R, G, and B color filters on the pixel area defined by the transparent light shielding pattern; preparing an array substrate to be aligned in opposition to the color filter substrate; forming an alignment layer on inner uppermost portions of the color filter substrate and the array substrate, respectively; coating a sealant on the array substrate formed with the alignment layer and dropping liquid crystal onto the array substrate corresponding to an inner portion of the sealant, thereby forming a liquid crystal layer; attaching the color filter substrate to the array substrate having the liquid crystal by using the sealant; curing the sealant by radiating UV light onto a resultant substrate, thereby fixedly combining the color filter substrate with the array substrate; and performing a thermal process with respect to the resultant substrate in such a manner that the color of the heat-sensitive pigment is changed to the black through the heat-sensitive reaction.

According to the preferred embodiment of the present invention, method further comprises a step of forming an over-coating layer on an entire surface of the glass substrate, after the color filters have been formed, in order to planarize the surface of the glass substrate.

In addition, the method further comprising a step of forming an electrode after the color filter or the over-coating layer has been formed.

The light shielding pattern is obtained by repeatedly coating, curing and patterning the resin including the heat-sensitive pigment. The curing process for the resin including the heat-sensitive pigment is performed at a temperature below a reaction temperature of the heat-sensitive pigment in order to prevent the heat-sensitive reaction of the heat-sensitive pigment. Preferably, the curing process for the resin including the heat-sensitive pigment is performed at a temperature of 100 to 140° C., or the resin is cured through a UV-curing process.

The R, G and B color filters are obtained by repeatedly coating, curing and patterning R, G and B pigments, respectively. The curing process for the R, G and B pigments is performed at a temperature below a reaction temperature of the heat-sensitive pigment in order to prevent the heat-sensitive reaction of the heat-sensitive pigment, or the R, G and B pigments are cured through a UV curing process. Preferably, the curing process for the R, G and B pigments is performed at a temperature of 100 to 140° C.

The heat-sensitive reaction occurs at a temperature of 150 to 250° C. while a thermal process is being performed with respect to the light shielding pattern.

BRIEF DESCRIPTION OF THE DRAWINGS

The above and other objects, features and advantages of the present invention will be more apparent from the following detailed description taken in conjunction with the accompanying drawings, in which:

FIGS. 2 and 3 are sectional views illustrating a light shielding pattern including a heat-sensitive pigment according to one embodiment of the present invention, in which FIG. 2 represents the light shielding pattern before the heat-sensitive reaction of the heat-sensitive pigment and FIG. 3 represents the light shielding pattern after the heat-sensitive reaction of the heat-sensitive pigment.

DETAILED DESCRIPTION OF THE PREFERRED EMBODIMENTS

Hereinafter, preferred embodiments of the present invention will be described in detail with reference to accompanying drawings.

A liquid crystal display (LCD) device according to the present invention includes an array substrate, a color filter substrate aligned in opposition to the array substrate, a sealant for combining the array substrate with the color filter substrate, and a liquid crystal layer aligned at an inner portion of the sealant and interposed between the array substrate and the color filter substrate through one-drop fill (ODF) technology.

Particularly, according to the LCD device of the present invention, a black matrix, which is a light shielding pattern provided on the color filter substrate, is made of resin including a transparent heat-sensitive pigment, in which a color of the transparent heat-sensitive pigment is changed to black when it is subject to the heat-sensitive reaction.

In this case, the resin including the transparent heat-sensitive pigment has a property of allowing UV light to easily transmit therethrough. Thus, when a UV-curing process is performed with respect to the sealant in order to employ the ODF technology, the UV light can be easily transmitted through the sealant due to the light shielding pattern.

Therefore, the present invention can solve the problem derived from the defective UV-curing of the sealant, so that the LCD device can be fabricated by using the ODF technology, thereby improving reliability and productivity of panels as well as the image quality of the LCD device. In addition, a thermal process is performed with respect to the light shielding pattern formed on the color filter substrate. Thus, a heat-sensitive reaction is incurred in the light shielding pattern, so that the color of the light shielding pattern is changed to black. Accordingly, the light shielding pattern can stably perform its original function of shielding the light introduced thereto from the array substrate in the LCD device.

Figure 1:
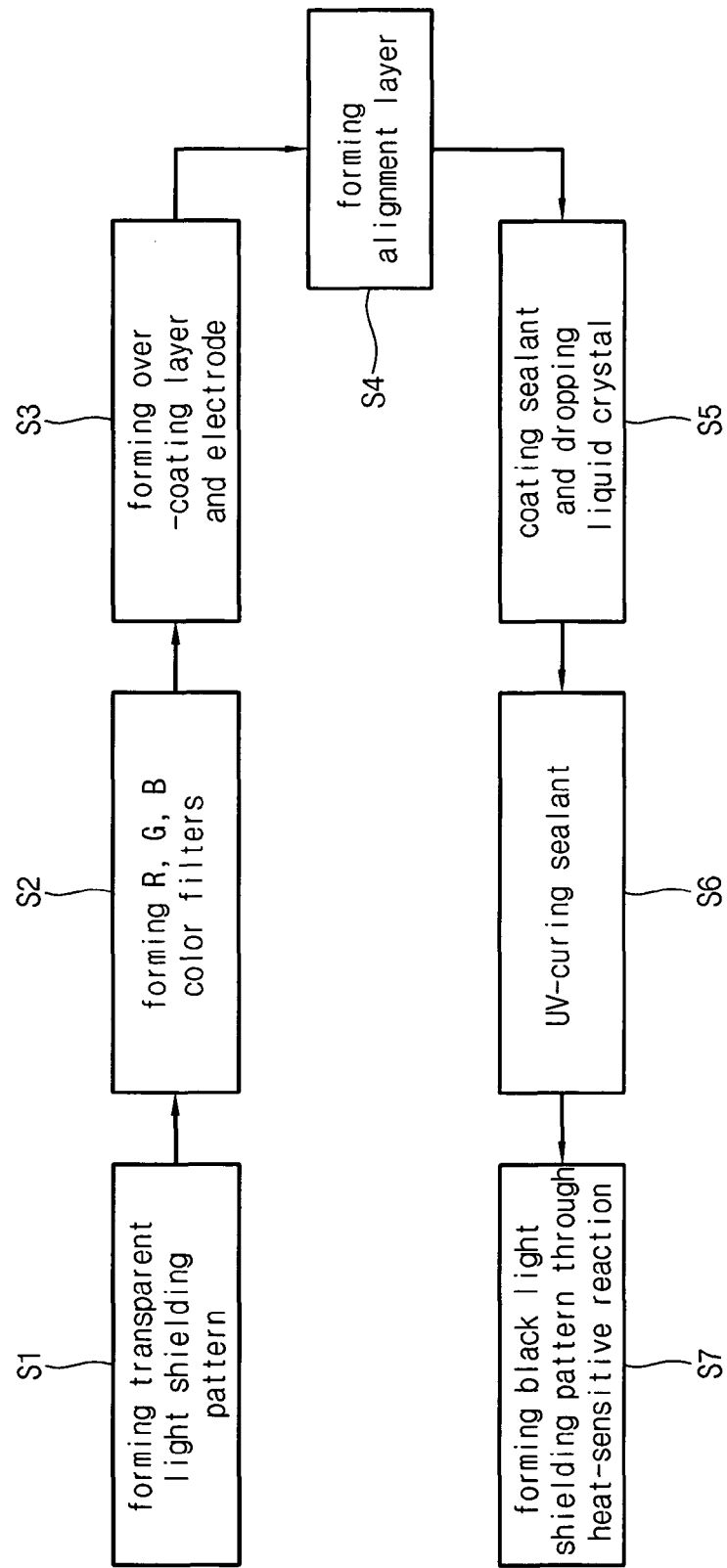
FIG. 1 is a block view illustrating the procedure for fabricating an LCD device by using a light shielding pattern including a heat-sensitive pigment according to one embodiment of the present invention.
Figure 2:
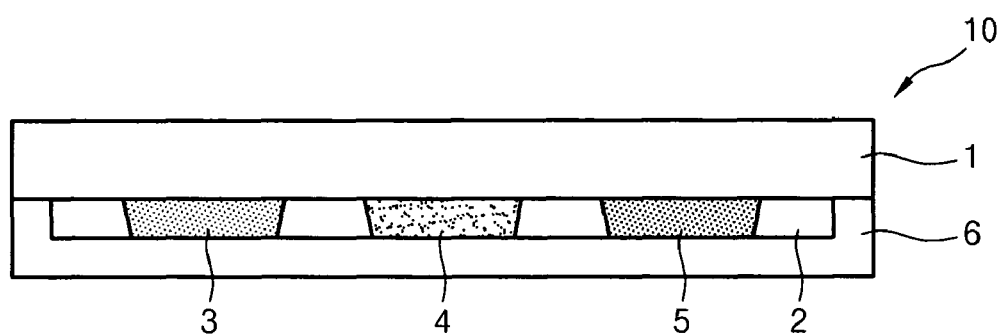
Figure 3:
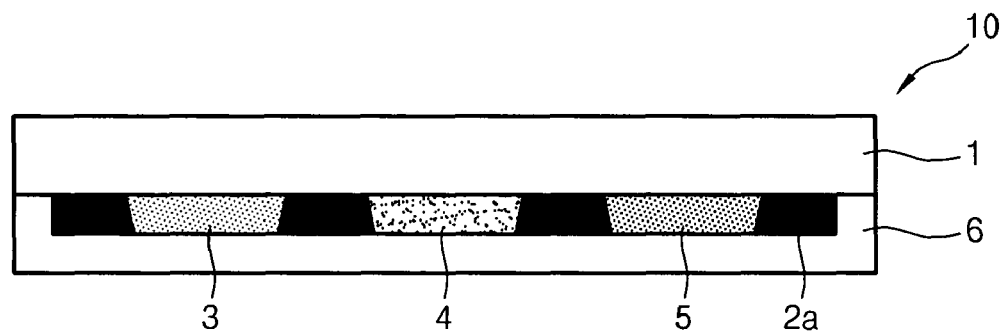

FIGS. 1 to 3 are views illustrating the LCD device having the light shielding pattern including the heat-sensitive pigment and the procedure for fabricating the LCD device according to the present invention. In detail, FIG. 1 is a block view illustrating the procedure for fabricating the LCD device by using the light shielding pattern including the heat-sensitive pigment according to the present invention, FIG. 2 is a sectional view illustrating the light shielding pattern before the heat-sensitive reaction of the heat-sensitive pigment and FIG. 3 is a sectional view illustrating the light shielding pattern after the heat-sensitive reaction of the heat-sensitive pigment.

Referring to FIG. 1, in order to fabricate the color filter substrate, a transparent light shielding pattern is formed on a transparent insulating substrate (e.g. a glass substrate) in such a manner that a pixel area is defined in the transparent insulating substrate (S1).

Herein, different from the conventional light shielding pattern made of resin including a black pigment, the transparent light shielding pattern according to the present invention is obtained through various processes of coating transparent resin including a heat-sensitive pigment, in which a color of the transparent resin is changed to black when it is subject to a heat-sensitive reaction at the temperature of 150 to 250° C., curing the transparent resin by performing a thermal process with respect to the transparent resin, and patterning the cured transparent resin. Therefore, the transparent light shielding pattern according to the present invention may allow the UV light to pass therethrough. In addition, the curing process for the transparent resin, which is a raw material for the transparent light shielding pattern, must be performed at the temperature below the reaction temperature of the heat-sensitive pigment (e.g. 100 to 140° C.) in order to prevent the heat-sensitive reaction of the heat-sensitive pigment. Otherwise, the UV-curing must be performed with respect to the transparent resin.

Then, R, G, and B pigments provided in the pixel area defined by the transparent light shielding pattern are repeatedly coated, cured and patterned, thereby forming a color filter having colors corresponding to each pixel (S2).

At this time, the curing process for the R, G, and B pigments must be performed at the temperature below the reaction temperature of the heat-sensitive pigment (e.g. 100 to 140° C.) in order to prevent the heat-sensitive reaction of the heat-sensitive pigment. Otherwise, the UV-curing must be performed for the R, G, and B pigments.

After that, an over-coating layer is formed on the entire surface of the glass substrate having the transparent light shielding pattern and the R, G, and B color filters in order to planarize the surface of the glass substrate. Then, an electrode made of a transparent metal, such as ITO, is formed on the over-coating layer, thereby obtaining the color filter substrate (S3).

Herein, the process for forming the over-coating layer can be omitted if the step difference between the transparent light shielding pattern and the R, G, and B color filters is small. That is, if the surface of the glass substrate has already been planarized to a predetermined level, the process for forming the over-coating layer can be omitted. In addition, although the electrode is necessary if the driving mode of the LCD device requires a vertical electric field, it is not necessary if the driving mode of the LCD device requires a horizontal electric field.

Subsequently, a polyimide layer is coated on the color filter substrate obtained through the above-mentioned procedure. If the polyimide layer coated on the color filter substrate has been cured, a rubbing process is performed with respect to the cured polyimide layer, thereby forming an alignment layer for determining an initial alignment of liquid crystal (S4).

After that, the metal signal line, such as a gate bus line, a common bus line and a data bus line, the thin film transistor (TFT) and the pixel electrode are formed on the glass substrate, which is the transparent insulating substrate, through the typical array process. In addition, the array substrate is prepared, in which the alignment layer is formed at an uppermost portion of the array substrate by coating, curing and rubbing the polyimide layer. Then, the sealant is coated on the array substrate and liquid crystal is dropped onto the array substrate, thereby forming the liquid crystal layer (S5).

Thereafter, the color filter substrate obtained through the above-mentioned procedure is attached to the array substrate formed with the sealant and liquid crystal. At this time, the color filter substrate can be secured to the array substrate by means of the sealant. After that, the UV light is radiated onto the resultant substrate, thereby curing the sealant (S6). As a result, the color filter substrate is fixedly attached to the array substrate.

When performing the UV-curing process with respect to the sealant, the UV light is preferably radiated toward the color filter substrate from a position above the color filter substrate. Since the UV light may pass through the transparent light shielding pattern formed on the color filter substrate, the sealant can be completely cured by means of the UV light. Thus, according to the present invention, the defective curing or partial curing of the sealant is efficiently prevented even if the ODP technology is employed. Therefore, the array substrate can be stably and fixedly combined with the color filter substrate, thereby improving reliability and productivity of panels as well as the image quality of the LCD device.

FIG. 2 is a sectional view illustrating the light shielding pattern before the heat-sensitive pigment of the light shielding pattern is cured.

As shown in FIG. 2, the light shielding pattern 2 is maintained in a transparent state, so that the UV light may be easily transmitted through the light shielding pattern 2 during the UV-curing process for the sealant. Accordingly, the sealant can be entirely cured.

In this state, the thermal process is performed with respect to the resultant substrate with a predetermined temperature sufficient for inducing the heat-sensitive reaction of the heat-sensitive pigment (e.g. 150 to 250° C.) (S7).

While the thermal process is being carried out, the heat-sensitive pigment of the light shielding pattern is subject to the heat-sensitive reaction so that the color of the light shielding pattern is changed to black. Thus, the light shielding pattern may perform its original function of shielding the light introduced thereto from the array substrate.

FIG. 3 is a sectional view illustrating the light shielding pattern after the heat-sensitive pigment of the light shielding pattern has been subject to the heat-sensitive reaction.

As shown in FIG. 3, the light shielding pattern 2a has a black color as a result of the heat-sensitive reaction of the heat-sensitive pigment, so that the light shielding pattern 2a can shield the light introduced thereto from the array substrate.

In FIGS. 2 and 3, reference numerals 1, 3, 4, 5, 6 and 10 represent a glass substrate, a red color filter, a green color filter, a blue color filter, an over-coating layer and a color filter substrate, respectively.

After that, although it is not illustrated, following processes including the post-treatment process and the assembling process are sequentially carried out, thereby fabricating the LCD device according to the present invention.

As described above, according to the present invention, the black matrix formed on the color filter substrate is made of resin including the heat-sensitive pigment, in which a color of the heat-sensitive pigment is changed to black when it is subject to the heat-sensitive reaction and the UV light can be transmitted through the heat-sensitive pigment, so the present invention can reliably cure the sealant through the UV-curing process even if the ODF technology is employed.

Therefore, the present invention can prevent the defects derived from the defective UV-curing of the sealant while employing the OFD technology, thereby improving reliability and productivity of the panels as well as the image quality of the LCD device.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display (LCD) device comprising:
    an array substrate including a first glass substrate formed with a metal signal line, a thin film transistor and a pixel electrode;
    a color filter substrate aligned in opposition to the array substrate and including a second glass substrate formed with a light shielding pattern and a color filter;
    a sealant interposed between the array substrate and the color filter substrate and cured as UV light is radiated thereto in order to fixedly combine the array substrate with the color filter substrate; and
    a liquid crystal layer aligned at an inner portion of the sealant and interposed between the array substrate and the color filter substrate through one-drop fill (ODF) technology,
    wherein the light shielding pattern is made of resin including a transparent heat-sensitive pigment, in which a color of the heat-sensitive pigment is changed to black when the heat-sensitive pigment is subject to a heat-sensitive reaction, the transparent heat-sensitive pigment allowing UV light to pass through so that the entire sealant is stably cured, and wherein the transparent heat-sensitive pigment is changed to black by a thermal process, thereby forming a light shielding black matrix for the color filter of the LCD device.

2. The LCD as claimed in claim 1, wherein the UV-curing process for the sealant is performed at a temperature below a reaction temperature of the heat-sensitive pigment in order to prevent the heat-sensitive reaction of the heat-sensitive pigment.

3. The LCD as claimed in claim 1, wherein the color of the heat-sensitive pigment is changed to black through the heat-sensitive reaction when the thermal process is performed at a temperature of 150 to 250° C.

4. The LCD as claimed in claim 1, wherein the color filter substrate further includes an over-coating layer formed on an entire surface of the second glass substrate formed with the light shielding pattern and the color filter in order to planarize the surface of the second glass substrate.

5. The LCD as claimed in claim 4, wherein the color filter substrate further includes an electrode formed on the over-coating layer.

6. The LCD as claimed in claim 1, wherein the color filter substrate and the array substrate are formed at uppermost portions thereof with alignment layers, respectively.

7. A liquid crystal display device comprising:
   an array substrate including a first glass substrate;
   a color filter substrate including a second glass substrate formed with a light shielding pattern and a color filter;
   a sealant interposed between the array substrate and the color filter substrate and cured by UV light radiated through the light shielding pattern in order to fixedly combine the array substrate with the color filter substrate;
   a liquid crystal layer aligned at an inner portion of the sealant and interposed between the array substrate and the color filter substrate;
   wherein the light shielding pattern is comprised of resin including a transparent heat-sensitive pigment, the transparent heat-sensitive pigment allowing UV light to pass through the transparent heat-sensitive pigment so that the sealant is stably cured, and the transparent heat-sensitive pigment changing to black when the temperature of the transparent heat-sensitive pigment is raised to a first temperature thereby forming a light shielding black matrix for the color filter.

8. The liquid crystal display device of claim 7, wherein the UV-curing process for the sealant is performed at a temperature below the first temperature.

9. The liquid crystal display device of claim 7, wherein the transparent heat-sensitive pigment is a pigment that changes to black when its temperature is raised above 150° C.

10. The liquid crystal display device of claim 7 wherein the color filter includes pigment cured at a temperature below the first temperature.

* * * * *